(12) United States Patent
Evslin et al.

(10) Patent No.: US 6,842,427 B1
(45) Date of Patent: Jan. 11, 2005

(54) METHOD AND APPARATUS FOR OPTIMIZING TRANSMISSION OF SIGNALS OVER A PACKET SWITCHED DATA NETWORK

(75) Inventors: Tom Evslin, Princeton, NJ (US); James E. Yu, Homdel, NJ (US); Bradley Miller, Windsor, NJ (US); Galeal Zino, Plainsboro, NJ (US); Roy Ho, Morganville, NJ (US)

(73) Assignee: ITXC IP Holdings S.a.r.l. (LU)

( * ) Notice: Subject to any disclaimer, the term of this patent is extended or adjusted under 35 U.S.C. 154(b) by 0 days.

(21) Appl. No.: 09/567,234

(22) Filed: May 9, 2000

(51) Int. Cl.[7] .................................................. H04J 3/14
(52) U.S. Cl. .................... 370/252; 370/352; 370/395.4; 370/400; 455/405; 455/552.1; 703/1; 703/21
(58) Field of Search ................................ 370/352, 353, 370/354, 355, 356, 252, 248, 395.4, 400; 455/405, 552.1; 703/1, 21, 22

(56) References Cited

U.S. PATENT DOCUMENTS

| | | | | |
|---|---|---|---|---|
| 5,440,719 A | * | 8/1995 | Hanes et al. ................... 703/21 |
| 5,920,711 A | * | 7/1999 | Seawright et al. ............ 703/15 |
| 6,411,946 B1 | * | 6/2002 | Chaudhuri .................... 706/21 |
| 6,466,925 B1 | * | 10/2002 | Harald et al. ................. 706/16 |
| 6,493,658 B1 | * | 12/2002 | Koford et al. ................. 703/1 |

* cited by examiner

*Primary Examiner*—Dang Ton
*Assistant Examiner*—Inder Pal Mehra
(74) *Attorney, Agent, or Firm*—Kaplan & Gilman, LLP

(57) ABSTRACT

A method and apparatus for optimizing routing through a data network is disclosed. Plural simulations are run on various links between network routers, and a central location may be used to compile the information from the links and calculate parameters of paths through the network. A graphical user interface to specify parameters of the simulations is also provided.

16 Claims, 2 Drawing Sheets

IP BASED NETWORK MONITORING

| FROM \ TO | TERM AFFILIATE 6 LOCATION 6 | TERM AFFILIATE 7 LOCATION 7 | SUPPLIER 8 LOCATION 8 | SUPPLIER 9 LOCATION 9 | COLOR INDICATOR |
|---|---|---|---|---|---|
| CUSTOMER 1 LOCATION 1 | – #CONC. CALLS<br>– CALL DURATION<br>– PACKET LOSS<br>– DELAY<br>– JITTER<br>– TIMESTAMP | | | | |
| CUSTOMER 2 LOCATION 2 | | INPUTS<br>– #CONC. CALLS<br>– CALL DURATION<br>– PACKET LOSS<br>– DELAY<br>– JITTER<br>– TIMESTAMP | | | |
| ORIG AFFILIATE 3 LOCATION 3 | – #CONC. CALLS<br>– CALL DURATION<br>– PACKET LOSS<br>– DELAY<br>– JITTER<br>– TIMESTAMP | RESULTS | TEST IN PROGRESS<br>– #CONC. CALLS<br>– CALL DURATION<br>– TIMESTAMP | | |
| ORIG AFFILIATE 4 LOCATION 4 | | | | – #CONC. CALLS<br>– CALL DURATION<br>– PACKET LOSS<br>– DELAY<br>– JITTER<br>– TIMESTAMP | |
| CUSTOMER 5 AFFILIATE 5 | | | | | |

*FIG. 2*

METHOD AND APPARATUS FOR OPTIMIZING TRANSMISSION OF SIGNALS OVER A PACKET SWITCHED DATA NETWORK

TECHNICAL FIELD

This invention relates to the transmission of information over a packet switched data network. In a preferred embodiment, the invention relates to a improved technique for transmission of voice over the Internet.

BACKGROUND OF THE INVENTION

Data transmission over packet switched networks, such as the Internet, has become extremely common and is growing rapidly. The Internet now carries traffic in the form of voice, data, video, or even facsimile. The transmission of information over the Internet presents problems, which are unique in a packet switching environment.

Specifically, information to be transmitted between points over the Internet is typically divided into small portions called packets. The packets are then addressed and transmitted out over the network by special switches also referred to as routers. Many packets associated with the same stream of information may take different paths through the network, hoping from router to router until ultimately being received and compiled by the destination. The path taken by packets through the Internet is typically uncontrolled by the end user. Rather, the end user simply enters an address for the data to be sent to, and the data is then off through the network hopping from router to router until being ultimately received. The user really has no idea which path is being taken.

The foregoing mode of operation is acceptable for data traffic since it is not time critical. Specifically, if a few of the packets are delayed more or less than other ones of the packets, it will simply result in a slight delay (e.g. a quarter of a second) before the data is received and/or printed by the receiving terminal.

Although it is always desirable to maximize the efficiency of transmissions through the data network such as the Internet, these optimizations are critical with respect to certain types of traffic. Voice and video traffic, for example, cannot tolerate variable delays with packets arriving significantly out of order. The quality of such signals seen by the receiving user will drastically degrade if significant numbers of packets are lost, significant jitter results, or packets are delayed or arrive out of order too frequently.

In connection with voice transmission over the Internet, it is particularly important to minimize factors, which distort the voice in transmission. These factors can include excessive delays due to packets being routed through the switches in a less than optimal manner, packet loss, delay, jitter, and other problems caused by the network. While some of the problems are accounted for through advanced error correction and signal processing algorithms, not all of the problems introduced by the network are easily corrected. Accordingly, it would be desirable to improve the manner in which packets such as voice and video are routed through plural routers in a packet switched data network.

Another drawback of prior art routing algorithms in packet switching routers is that they are often not optimized for voice and/or video traffic. Such routers do not take into account changing voice traffic patterns over the Internet, and alternative paths that may provide better quality voice.

In view of the above, there exists a need in the art for an improved technique of routing voice and other signals through the Internet and other data networks that accounts for varying traffic patterns. Ideally, such a technique should be flexible, allow for changes in traffic patterns, and vary in accordance with network conditions.

SUMMARY OF THE INVENTION

The above and other problems of the prior art are overcome and a technical advance is achieved in accordance with the present invention, which relates to an algorithm for continually, during the course of operation, updating and optimizing the route taken by packets through the network. In accordance with the present invention, specialized call simulators are placed at strategic locations (e.g., collocated with specified routers) throughout the network. The simulators, preferably on a frequent basis, simulate voice traffic between specified routers and measure the performance results of particular communications link between routers. The total path from end to end is then derived by combining the information from the simulators, an optimal path is calculated and used for voice traffic instead of the normal routing algorithm through the Internet. Although voice is used as an example, other types of traffic may also be simulated and optimally routed.

An enhancement includes a user-friendly graphical user interface (GUI). The GUI allows an operator to specify the type of traffic to simulate (e.g. call volume, average call duration) between specified routers. This enhancement allows the system to optimize call paths based upon particular conditions that are to be present in the network.

BRIEF DESCRIPTION OF THE DRAWINGS

FIG. 2 shows a sample Graphical User Interface (GUI) for use in conjunction with the present invention.

DETAILED DESCRIPTION OF THE PREFERRED EMBODIMENT

Figure 1:
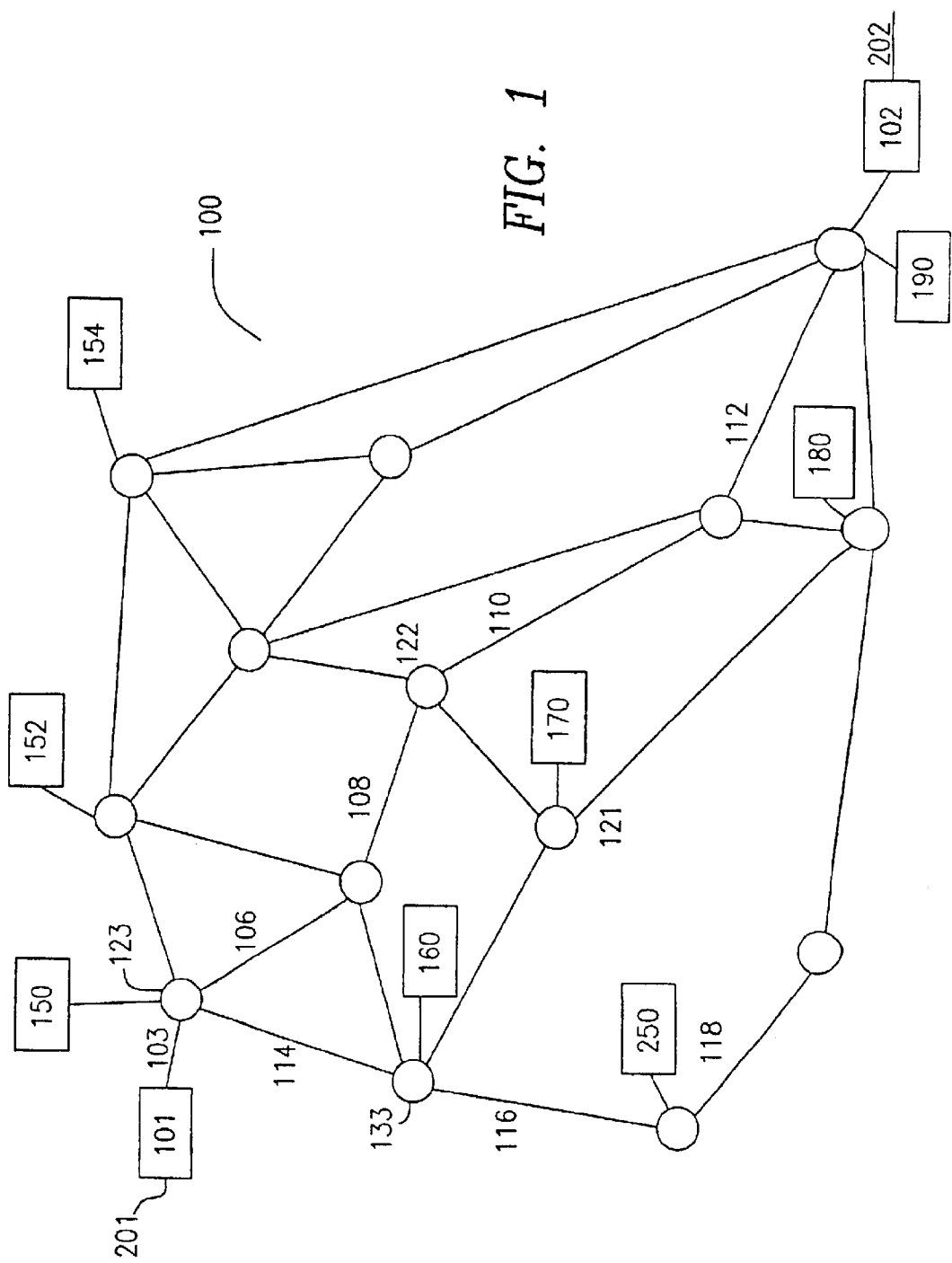
FIG. 1 is a conceptual diagram of an exemplary portion of a network in which the techniques of the present invention may be implemented.

FIG. 1 shows an exemplary diagram of small portions of a data network 100 including a plurality of routers (e.g., 121 and 122) as well as an initiating and terminating gateway 101 and 102 respectively. The system in FIG. 1 also includes links between selective routers for the transmission of data (e.g., 108 and 110).

Each of gateways 101 and 102 are intended to be utilized to interface from, for example, the public switched telephone network (PSTN) to the Internet 100. Specifically, calls arrive at the gateways and are translated into Internet packets for transmission over the Internet. Once data packets are on the Internet, the routers route the data packets from router to router until the final destination is reached. The receiving gateway 102 then recompiles the packets into voice and transmits the analog voice to the called party, as explained in more detail below.

The purposes of explanation herein, we presume that this desire to transmit a telephone call arriving from the PSTN on line 201 to a different telephone over a connection to the PSTN 202. The portion 100 of the Internet represented in FIG. 1 may in fact span countries or even continents.

In a typical voice over the Internet protocol (VOIP) telephone call, data from the PSTN enters via line 201 at gateway 101. The gateway is responsible for converting the PSTN voice into digital packets of compressed voice, and transmitting such digital packets over the Internet beginning at line 103. The router 123 receiving such packets and routes the packets in accordance with known routing algorithms through the various routers shown until they arrive at a destination gateway 102. The destination gateway 102 may then convert such packets back into analog voice for transmission over the PSTN via line 202. As previously indicated, there is typically little control over the path taken by the packets through the network 100, and indeed, packets that are part of the same telephone call may take different paths at different times during the call. The paths taken by the packets are a result of routing tables on a routing algorithm executed by each of the routers.

In accordance with the techniques of the present invention, selected routers are combined with call simulators showing schematically as 150 and 152, for example. Only selected points in the network are connected to such simulators.

The simulators are able to transmit test packets of voice and the simulators may be programmed to transmit test packets of voice that simulate a specified number of concurrent calls with an average duration of a predetermined amount. Preferably, the test packets appear to other routers to be an actual voice call, so that the routers do not reject such test packets as if they were "ping" packets typically utilized over the Internet.

Specified routes through the network are tested by the test packets. For example, voice calls are simulated by simulator 150, and sent to simulator 160. Simulator 160 may then determine the quality of service between routers 123 and 133. Simulator 160 then runs a similar simulation between itself and simulator 170. By running such simulations between simulators 170 and 180, and 180 and 190 a full path through the network from gateway 101 to gateway 102 is provided. The results of such simulations, which may include parameters such as Jitter, Packet loss, delay, and others, are all compiled by a central location, which may be the initial simulator 150 or some other central network monitoring site that communicates with the simulators to obtain information and with the routers to issue routing instructions as a result of the simulations.

In addition to the above, and preferable simultaneously therewith, the route through the network from gateway 101 to gateway 102 through another path is also tested. For example, simulations may be run through the network by simulators 150, 152, 154, and 190 in order to provide statistics regarding an alternative path through the network. In operation, plural paths through the network, each of which comprises several links of a communications channel, may be tested through the use of such simulators. Statistics regarding which of the links is best suited for voice traffic may then be calculated. The routing tables in the originating gateway 101 as well as in the routers along a chosen path are then updated to ensure that voice packets being transmitted between the shown gateways take a specified path.

The tests may be run periodically in order to account for varying network conditions. In a preferred embodiment, the links between particular routers may be tested substantially in parallel, so that the simulation/testing time is minimized.

FIG. 2 shows an exemplary user interface that may be implemented in an embodiment of the present invention. The user interface includes a matrix that represents links from and to various gateways and routers in the network that include a simulator such as 154 of FIG. 1. The arrangement of FIG. 2 includes plural boxes 291, several of which are filled in for explanation purposes. Each location in the matrix represents a link from a specified router to another router along a path. Thus, for example, box 292 represents the link from location (router) 3 to a location (router) 6.

As indicated in several of the exemplary boxes of FIG. 2, the number of concurrent calls and the average duration of the calls are parameters that may be entered by the operator of the system. These parameters are then used to simulate traffic on the link represented by the box in issue. These parameters may be entered with respect to each link specified as part of a potential call path through the network. Additionally, the software which generates the user interface is programmed, with the routes through the network, that make up the a particular path. Specifically, each path through the network is represented by a plurality of links, as indicated if figure one, and thus, by a plurality of the boxes of FIG. 2. The calculations of paths through the network are accomplished by combining the statistics from the known boxes that represent links along a particular path through the network.

In practical systems, the calculations and path selection may be done in one or more locations, or in a central location. The central location may receive the statistics from each link, compile and combine such statistics to determine the quality and characteristics of particular links, derive the quality and characteristics of particular alternative paths through the network between specified gateways, and perform path selection. Such a central location may then instruct the appropriate routers and gateways regarding the routing of packets through the network.

The shown interface may also include provisions for allowing other types of data to be input to the system. For example, if the simulations are to be repeated at specified times, that information would also be put into the system. Other parameters regarding the volume and type of traffic to be simulated are possible.

While the above describes the preferred embodiment of the invention, various other modifications and additions will be apparent to those of ordinary skill in the art. Such modifications are intended to be covered by the following claims.

What is claimed:

1. A method of optimizing implementation of a communications session through a packet switched data network, the data network having a plurality of routers interconnected to each other, the method comprising steps of:

(a) transmitting a set of simulated voice packets from a first router to a second router, the packets being transmitted in such a manner as to simulate a specified number of concurrent calls with a predetermined average duration;

(b) measuring parameters indicative of quality of said transmission between said first router and said second router; and (c) combining said parameters in such a manner as to ascertain quality associated with a communications path between said first router and said second router.

2. The method of claim 1 wherein steps a–c are conducted between plural sets of first and second routers, and further comprising the steps of combining results obtained from conducting said steps a–c through said plural sets of routers to obtain results for a full path through a portion of the network via specified routers.

3. The method of claim 2 wherein said steps a–c are conducted substantially concurrently among said plural sets of routers.

4. The method of claim 2 wherein said steps a–c are conducted through plural sets of routers to obtain results for a plurality of different paths through the network to obtain results for each of said paths.

5. The method of claim 4 wherein all of said results are analyzed to pick a best path through the network for implementing a specified communications channel.

6. The method of claim 2 further comprising deriving information from step a–c to optimize communication.

7. The method of claim 5 further comprising providing a user interface that allows a user to choose parameters of traffic to be simulated.

8. The method of claim 7 wherein said user interface includes a graphical user interface (GUI) that permits selection of prescribed number of concurrent calls or an average call duration to be simulated.

9. The method of claim 2 wherein said steps are repeated multiple times and said results are updated accordingly.

10. A system for transmitting signals over a packet switched network, said system comprising a plurality of routers connected to each other such that plural paths between a destination gateway and a source gateway are formed, means for simulating voice traffic by transmitting simulated voice packets on various communications links between selected ones of said routers in such a manner as to simulate a specified number of concurrent calls with a predetermined average duration, and means for forming a specified communications path through said packet switched network by combining communications links to produce a path through said packet switched network, and means for selecting a path from said plural paths.

11. The system of claim 10 wherein said means for selecting accounts for at least two of the following parameters: Packet loss, delay, and jitter.

12. The system of claim 10 comprising a gateway or router that updates its routing tables whenever a better path through the network is formed.

13. The system of claim 12 further comprising a storage facility for storing information indicative of which paths through the packet switched network are preferred at which times, and of automatically changing the routing tables to implement said path at such times without further simulation.

14. A method of determining optimum routing through a data network for completion of voice or video calls over the data network, the method comprising:

inputting, through a graphical user interface (GUI) simulation parameters associated with each of a plurality of links along a path, said simulation parameters including a specified number of concurrent calls with a predetermined average duration;

performing a simulation by transmitting simulated voice packets across said path based upon said simulation parameters;

transmitting results of said simulation to a central location;

deriving, at said central location and based upon results of plural simulations, information indicative of which of which of a plurality of paths through the data network is optimal; and causing packets of data to be routed through the data network along said path.

15. A method of determining optimum routing through data network for completion of voice or video calls over the data network, the method comprising:

inputting, through a graphical user interface (GUI) simulation parameters associated with each of a plurality of links along a path;

performing a simulation across said path based upon said simulation parameters;

transmitting results of said simulation to a central location;

deriving, at said central location and based upon results of plural simulations, information indicative of which of which of a plurality of paths through the data network is optimal; and causing packets of data to be routed through the data network along said path, wherein said step of inputting comprises inputting said simulation parameters through a matrix of boxes, each of which represents a link between two routers in the data network, and displaying parameters of each of said links in said boxes.

16. The method of claim 15 further comprising the step of inputting a frequency at which said simulation should be repeated.

* * * * *